United States Patent [19]

Abdel-Mottaleb

[11] Patent Number: 5,572,565
[45] Date of Patent: Nov. 5, 1996

[54] AUTOMATIC SEGMENTATION, SKINLINE AND NIPPLE DETECTION IN DIGITAL MAMMOGRAMS

[75] Inventor: Mohamed Abdel-Mottaleb, Ossining, N.Y.

[73] Assignee: Philips Electronics North America Corporation, New York, N.Y.

[21] Appl. No.: 367,022

[22] Filed: Dec. 30, 1994

[51] Int. Cl.$^6$ ........................................................ A61B 6/00
[52] U.S. Cl. ............................................. 378/37; 382/132
[58] Field of Search ...................... 378/37, 210; 382/130, 382/131, 132, 133

[56] References Cited

FOREIGN PATENT DOCUMENTS 9514966  6/1995  WIPO .

OTHER PUBLICATIONS

"Computerized Detection of Masses in Digital Mammograms: Automated Alignment of Breast Images . . . " Fang–Fang Yin et al, Med. Phys. vol. 21, No. 3, Mar. 1994, pp. 445–452.

"Computer Aided Detection and Diagnosis of Masses and Clustered Microcalcifications from Digital Mammograms" Robert Nishikawa et al, SPIE vol. 1905, pp. 422–432.

"Computerized Detection of Masses in Digital Mammograms: Analysis of Bilateral Substration Images" Fang–Fang Yin et al, Med. Phys. 18(5) Sep./Oct. 1991 pp. 955–963.

"Image Processing for Recognition of Tumor on Mammography" S. Yabashi et al, Proceedings of the 1989 International Symposium on Noise and Clutter Rejection in Radars and Imaging Sensors, pp. 182–185.

*Primary Examiner*—David P. Porta
*Assistant Examiner*—David Vernon Bruce
*Attorney, Agent, or Firm*—Jack D. Slobod

[57] ABSTRACT

Digital mammograms are automatically segmented into background, corresponding to the region external of the breast, and foreground, corresponding to the region within the breast, by the detection of the skinline which forms a border between these regions. A binary array is produced representing an initial coarse segmentation between foreground and background in which a binary one value is assigned to each pixel in the binary array whose intensity exceeds an intensity threshold and/or whose gradient amplitude exceeds a gradient threshold.

3 Claims, 5 Drawing Sheets

AUTOMATIC SEGMENTATION, SKINLINE AND NIPPLE DETECTION IN DIGITAL MAMMOGRAMS

RELATED APPLICATIONS

This application is related in subject matter to the application owned by the same assignee as this application which was filed as Ser. No. 08/175,805 on Dec. 30, 1993, entitled "Automatic Segmentation and Skinline Detection in Digital Mammograms". It is also related in subject matter to the application by the same inventor as this application entitled "Mass Detection By Computer Using Digital Mammograms Of The Same Breast Taken From Different Viewing Directions", which is filed simultaneously with this application.

BACKGROUND OF THE INVENTION

1. Field of the Invention

The present invention relates generally to methods of and systems for Computer-Aided Diagnostic Mammography (CADM). In its more particular respects, it relates to automatic segmentation of digital mammograms into background, corresponding to the region external of the breast, and foreground, corresponding to the region within the breast, and automatic detection of a boundary contour or border between these regions as well as the detection of the nipple.

2. Description of the Related Art

Methods for segmentation and skinline detection are known from Nishikawa, R., et al, "Computer-aided detection and diagnosis of masses and clustered microcalcifications from digital mammograms," SPIE 1905–46, February 1993 and from Yin, F. et al, "Computerized detection of masses in digital mammograms: Analysis of bilateral subtraction images," Medical Physics 18 (5), September/October 1991, both reflecting work at the University of Chicago and from Yabashi, S, et al. "Image Processing for recognition of tumor on mammography", Proceedings of the 1989 International Symposium on Noise and Clutter Rejection in Radars and Imaging Sensors.

Breast cancer is one of the primary causes of death for women in western societies. Because the vast majority of deaths due to cancer that originated in the breast could be prevented by early detection, national health organizations in the United States recommend that all women over the age of 50 have regular screening mammograms.

The reading or interpretation of screening mammograms is an art that requires extensive experience and attentiveness to detail. While the mammographer's primary sign for cancer is a mass visible on the mammogram, one of the more sensitive signs is the presence of small relatively bright spots (in film-screen mammography) corresponding to locally increased X-ray attenuation due to minute deposits of calcium salts known as microcalcifications, which are arranged in clusters. In fact, clustered micro-calcifications are often the only sign indicating an early in situ malignancy. However, identification of these clusters is difficult because they are frequently obscured by gradations in intensity produced by the surrounding tissue. Both the volume of mammograms to be interpreted and the difficulty of identifying the aforementioned and other not easily recognizable signs of malignancy motivate developments in Computer-Aided Diagnosis of Mammograms (CADM) to at least automatically mark or enhance features of interest, including suspect areas, in images displayed on a monitor for interpretation by the mammographer.

Digital mammograms suitable for computer-aided diagnosis may be obtained by scanning film taken by conventional X-ray mammography or by utilizing other X-ray detector types that produce electronic image signals that may be directly digitized without the necessity of producing a film intermediate. These detector types include X-ray image intensifier/camera chain, photostimuable phosphor plate/laser readout (see U.S. Pat. No. 4,236,078), and selenium plate/electrometer readout technologies. Such technologies are progressing in their spatial resolution and contrast sensitivities achieved and the latter two, particularly, may soon find widespread use for mammographic applications.

One of the early steps in a CADH system is to segment the image into foreground (corresponding to the breast) and background (corresponding to the external surround of the breast). This segmentation reduces the amount of further processing because extraneous pixels belonging to the background, which may be as many as two thirds of the pixels in the image, are removed from further consideration. The segmentation also produces information from which the boundary contour or border between the foreground and the background, theoretically at the skinline, could be ascertained. An understanding of how mammographers utilize the skinline in film-screen mammography today would be helpful at this point.

Mammographers review X-ray films of breasts taken from different views or projection directions. These include the head-to-toe viewing direction known as cranio-caudal (CC), the side-to-side viewing directions known as medio-lateral (ML) or lateral-medial (ML) and the viewing direction which is typically at a 45° angle between head-to-toe and side-to-side known as oblique (OB). Due to the varying composition of the breast (a mixture of fat, parenchyma and stroma tissues) the contrast seen on mammograms varies tremendously across images. Often the skinline is not visible in one or all of these views. When a mammographer is not able to see the skinline on the viewing box, a special high intensity incandescent light, known as a hot light, is used to help locate the skin boundary and the subcutaneous region below it.

Locating the skinline is important to a mammographer in two respects. First, in and by themselves, skin conditions have diagnostic significance. Thickening in the skin and skin retractions are indications of malignancy. Conversely, microcalcifications found on, or immediately below the skinline are considered benign. Second, the skinline acts as a landmark. The locations of abnormalities, in many instances, are reported relative to the skinline, e.g. 2 cm. below the skinline. In addition, once a mammographer finds a suspicious lesion in one view, he must locate the same in another view. He does this by measuring the distance between the detected object and the skinline in one view and by looking for a similar object in the second image on an imaginary line the same distance away from the skinline. Finally, the mammographer has to assure that equal amounts of tissue, between skinline and chest wall, are visualized in all views taken. Routinely, the distance between a point on the skinline (typically the nipple if it can be detected visually) to the edge of the film in the direction of the chest wall is measured for all views. These distances should be approximately equal. If there are large discrepancies, the films are retaken.

Other uses of the skinline is as a registration aid in comparing images of the left and right breasts, or in comparing views of the same breast taken at different times, e.g. current and last previous studies. Lastly, the skinline can guide a visual search for the nipple, which like the skinline, is also a landmark. Unless the nipple is marked by a metal bead when the mammogram is taken, it is very difficult to detect. Often, it is not visualized in profile due to patient positioning or rolling over of the skin.

In the aforementioned publications reflecting work at the University of Chicago, the background is separated from foreground by an initial global threshold operation. This is followed by a morphological close operation to separate the gland from the noisy exterior. A tracking scheme using 4-point connectivity is used to trace the border. The border is smoothed using a running average of border coordinates. This is done independently for images of right and left sides. However, the smaller of the two detected borders is chosen and superimposed on both images for subsequent processing.

The problem with the aforementioned prior art methods is their exclusive reliance on a global threshold to accomplish the initial segmentation. One difficulty is in automatically selecting a meaningful threshold. Another difficulty is that whatever threshold is chosen, it may not consistently and reliably segment the mammogram because, due to noise and artifacts, the gray levels in the background and foreground can overlap and/or may necessitate manual cropping to eliminate background artifacts. Such manual cropping will become more difficult once American College of Radiology (ACR) labeling recommendations are adopted more widely. Further, it has been found that the boundary generated by this prior art method is likely to be at the dense parenchyma below the subcutaneous fatty region of the skin rather than the skinline itself. Since the subcutaneous fatty region could be as thick as 2.5 cm., the tissue erroneously labelled as background could be substantial.

In the Yabashi et al. publication, a one-dimensional gradient operation is applied to individual lines of data, and a threshold is applied to the determined unidirectional gradient generally normal to the chest wall to find the edge of the skin. Such an approach will not adequately segment the breast at points along the skinline where the normal to the skinline is significantly different from the normal to the chest wall.

Further, automatic detection of the nipple is not generally known. Such automatic detection could provide a reference point for visual or automatic correlation or registration of mammogram views of the same breast taken at different times or from different viewing directions or between mammogram views of the left and right breasts from the same viewing direction.

SUMMARY OF THE INVENTION

It is an object of the present invention to provide a method of and system for segmenting digital mammograms into foreground and background which automatically and reliably detects the skinline, in the presence of typical noise and background artifacts, for superposition on a display generated from the mammogram.

It is a further object of the present invention that the skinline and the nipple be automatically and reliably detected.

It is yet another object that the foregoing method be computationally efficient so that it could be accomplished within a reasonably small processing time.

These and other objects of the present invention are satisfied by performing the segmentation based on the combination, in particular, the union, of the set of pixels whose amplitude exceeds a global amplitude threshold and a set of pixels generally in the form of a band along the breast side of the skinline produced by an edge detection operation. The latter set of pixels is prefererably those whose gradient amplitude exceeds a gradient threshold.

As a result of the shape of the breast, the thickness of breast tissue in the viewing direction decreases as the skinline is approached. The gradient of a run of foreground pixels in the vicinity of the skinline tends to be relatively large, to be directed normal to the skinline, and to have a constant sign corresponding to reduced attenuation as the skinline is approached from points within the breast. In the vicinity of the skinline, the foreground has gradients that are substantially different from those of the background. A key observation is that in producing the union of the set of pixels whose amplitude exceeds the global amplitude threshold and the set of edge detection pixels, the value of the global amplitude threshold is not critical. The result is a binary image or mask from which the skinline is readily extracted since this binary image has few gaps or discontinuities in the contour between foreground and background. The contour is completed at gaps of unwanted connection between foreground and background using a curve fitting interpolation procedure. Thereafter, holes in the breast are filled in using a connected component procedure and noise in the background is removed using morphological erosion and dilation. The resultant binary image contains all binary ones in the breast region and all binary zeros in the background region. The contour or border between these regions is extracted as the skinline and the skinline is superimposed on the input image.

Next a segment of the skinline of greatest curvature is selected and a search is made of the input image at small regions within the breast adjacent points along the skinline segment. This search utilizes the fact that within the breast at the nipple there is subcutaneous parenchymal tissue which because of its relatively large X-ray attenuation characteristics produces a relatively bright area in the mammogram. The point on the skinline adjacent the small region having the greatest average intensity value is chosen to be the nipple position. This point is also superimposed on the mammogram.

BRIEF DESCRIPTION OF THE DRAWING

Other objects, features and advantages of the invention will become apparent upon perusal of the following detailed description when taken in conjunction with the appended drawing, wherein.

DETAILED DESCRIPTION OF THE PREFERRED EMBODIMENTS

Figure 1:
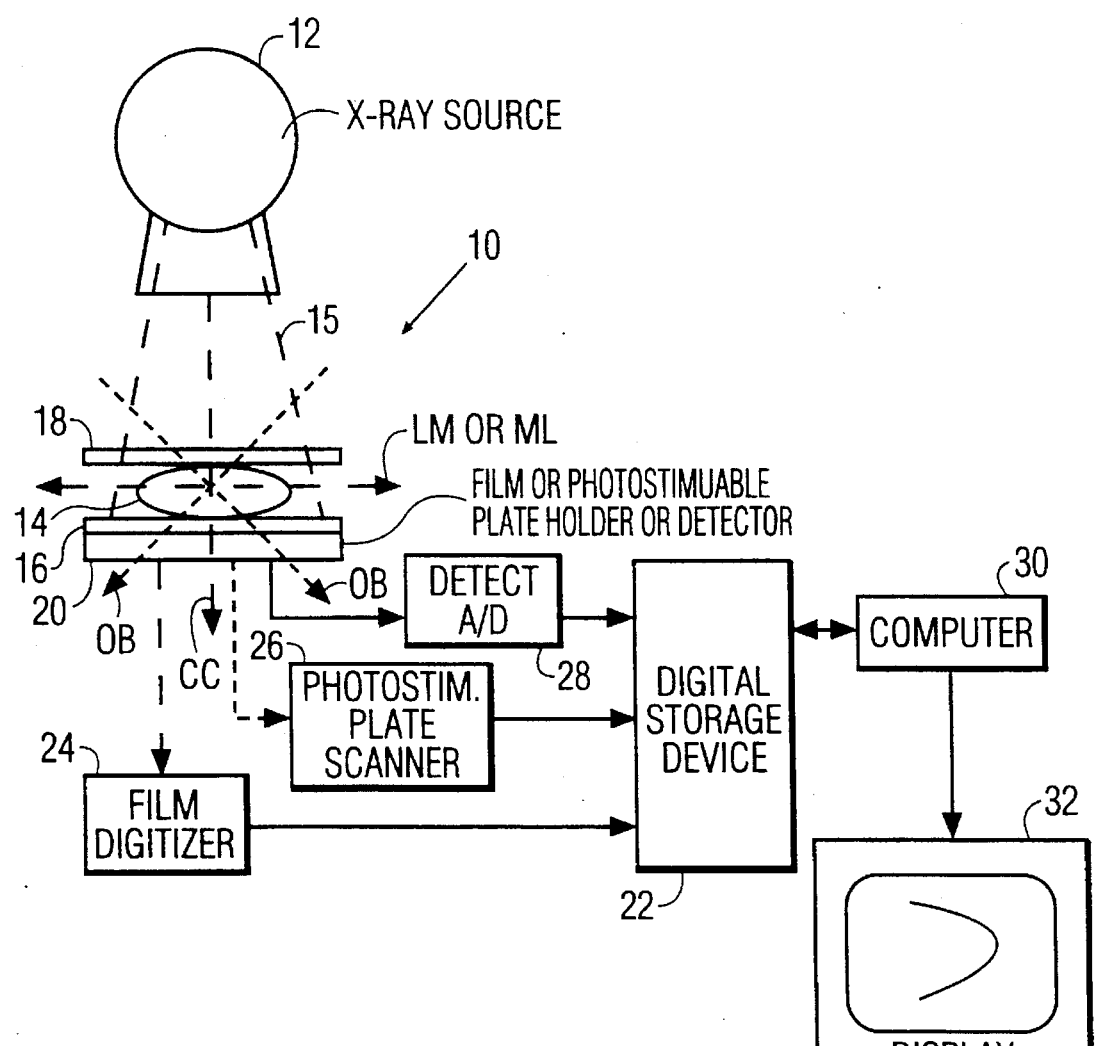
FIG. 1 is a schematic diagram of a computer-aided system in accordance with the invention for taking and processing mammograms.

Referring first to FIG. 1, there is shown a computer-aided mammography system 10, with its mammogram taking parts arranged for a cranio-caudal (CC) view, including an X-ray source 12 directed to irradiate a breast 14 of a standing subject with an X-ray beam 15. The breast 14 is received and compressed between generally planar lower and upper members 16, 18, using a predetermined compression force or weight. Below lower member 16 is a two-dimensional X-ray detector means 22 for detecting within a rectangular field of pixels, the X-ray radiation passing through breast 14 and its immediate external surround. X-ray detector means 22 is alternatively a film or a photostimuable phosphor image plate received in a holder, or a selenium plate/electrometer readout detector. An X-ray image intensifier/camera chain is also a suitable detector means. The X-ray source 12, plates 14 and 16 and detector means 20 may be rotated as a unit about transverse axis A to receive and irradiate breast 14 along any of the viewing directions labelled in FIG. 1 as CC (cranio-caudal), LM or ML (latero-medial or medial-lateral) and OB (oblique).

Whichever detector means 20 type is used, ultimately there is a two-dimensional array of digital pixels, representing the mammogram X-ray projection image, stored as an image file in a digital storage device 22 which may comprise a RAM, hard disk, magneto-optical disk, WORM drive, or other digital storage means. When film is used, it is developed and then scanned in a digitizer 24. Today, films may be digitized to 100 micron spatial resolution, yielding typical images ranging in size from 1672×2380 to 2344×3016 pixels, each up to 12 bit intensity resolution. When a photostimuable plate is used, it is scanned by a laser in scanner 26 yielding a similar image size and typically 10 bit intensity resolution. Lastly, when a detector such as a selenium plate/electrometer readout device is utilized, it directly produces analog electrical signals that are converted to digital form by its digital to analog converter 28.

The two-dimensional array of digital pixels stored in device 22, representing the mammogram, is processed by computer workstation 30 to mark or enhance features of interest in the mammogram, including the skinline, and display the resultant processed mammogram on display device 32, such as a CRT monitor. As a preliminary step, the stored mammogram may be reduced in resolution, spatially by a suitable median filter, and/or in amplitude by truncation, to an image on the order of 500,000 to 2,500,000 pixels and 8-bit to 10-bit intensity resolution consistent with the spatial and gray scale resolution of the monitor. In the processing to mark or enhance features, the mammogram is segmented into foreground, corresponding to the breast, and background, corresponding to the external surround of the breast and the skinline is detected in the course of this segmentation. The segmentation allows background to be eliminated from the search for features of interest, such as masses or clusters of microcalcifications, to be marked or enhanced.

At this point it would be useful to understand the nature of the background portion of a mammogram in a film. The background-proper is ideally the "empty and dark" region. In reality, this region is neither empty nor homogeneously dark. It contains noise, texture from the protective plastic layer of the film, striations and lines caused by rollers in the film processor, and the effects of scattered radiation around the breast boundaries. The digitization process adds further structured and unstructured noise to the image. In addition there are a collection of objects in the nature of labels which follow the labelling recommendations of the American College of Radiology (ACR)

Figure 2:
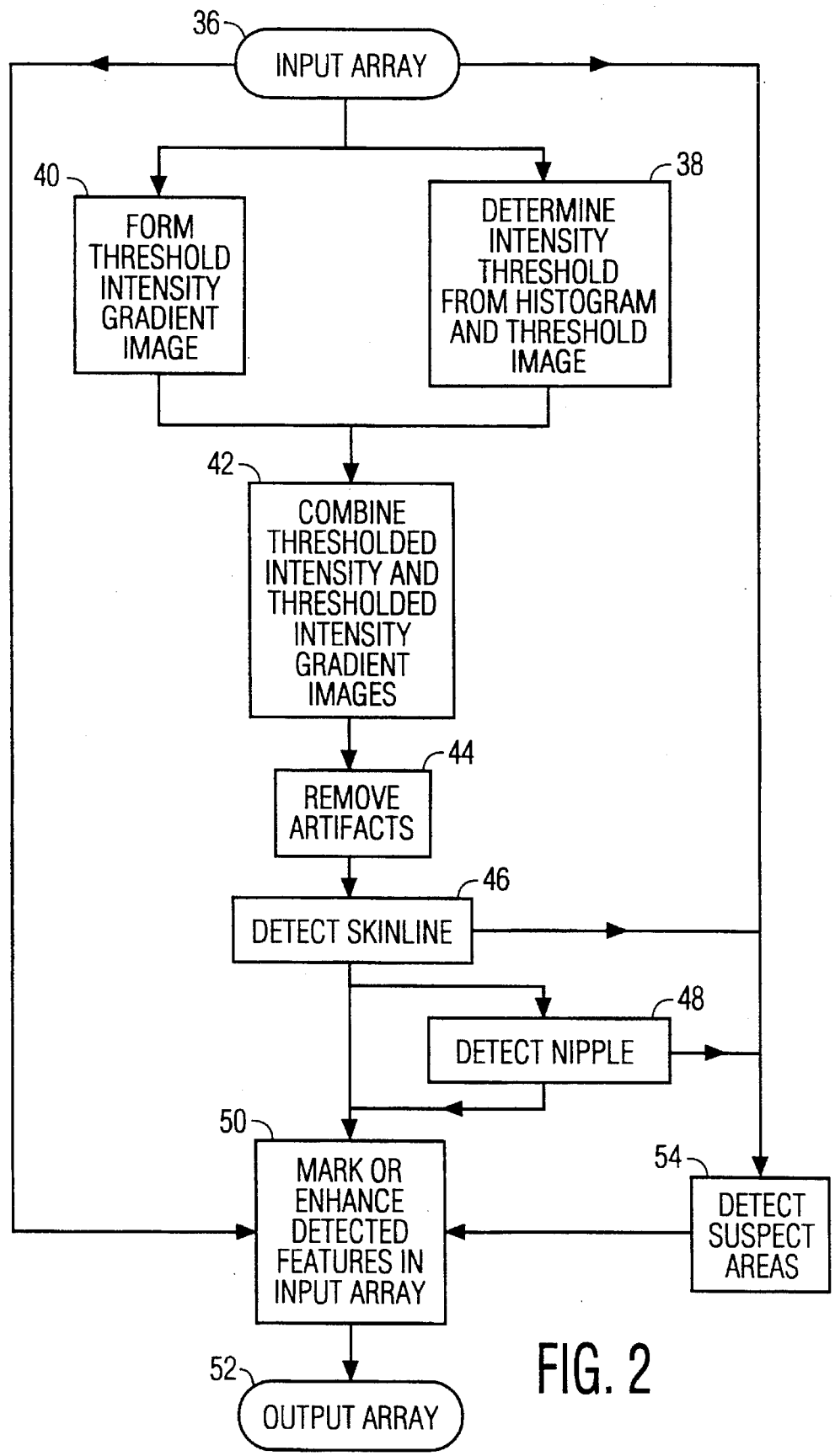
FIG. 2 is a flow chart indicating the processing performed by a computer in FIG. 1.
Figure 4C:
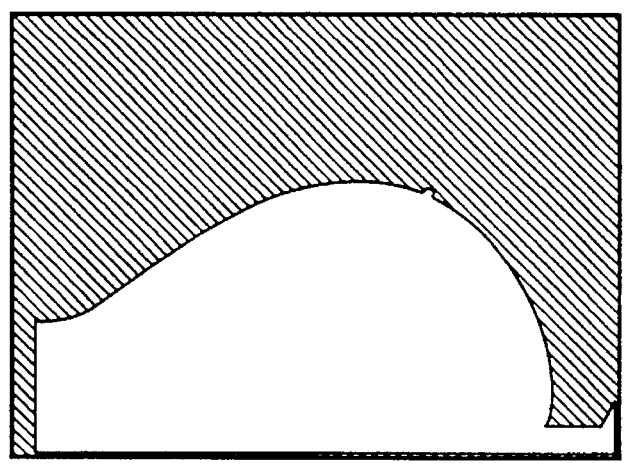
FIGS. 4B through 4E show binary images derived from the original mammogram image at different stages of processing.
Figure 4B:
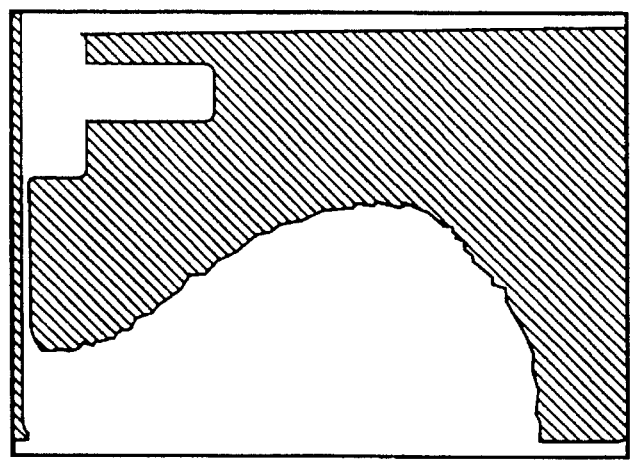
Figure 4A:
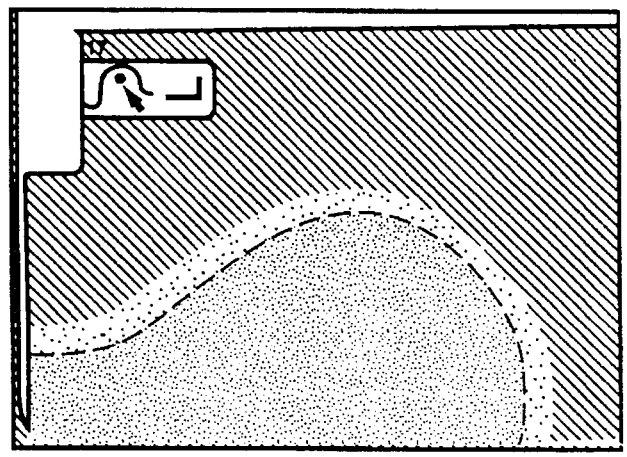
FIG. 4A illustrates an original mammogram image.

The procedure carried out by computer 30 is flowcharted in FIG. 2. Therein, the stored original image as appropriately reduced in spatial and amplitude resolution comprises the input array 36. Preferably, the pixels thereof are 40 micron square and have 256 gray scale levels. A typical input image represented by this array is shown in FIG. 4A, which is for the purposes of illustration an oblique, latero-medial or medial-lateral view.

Figure 3:
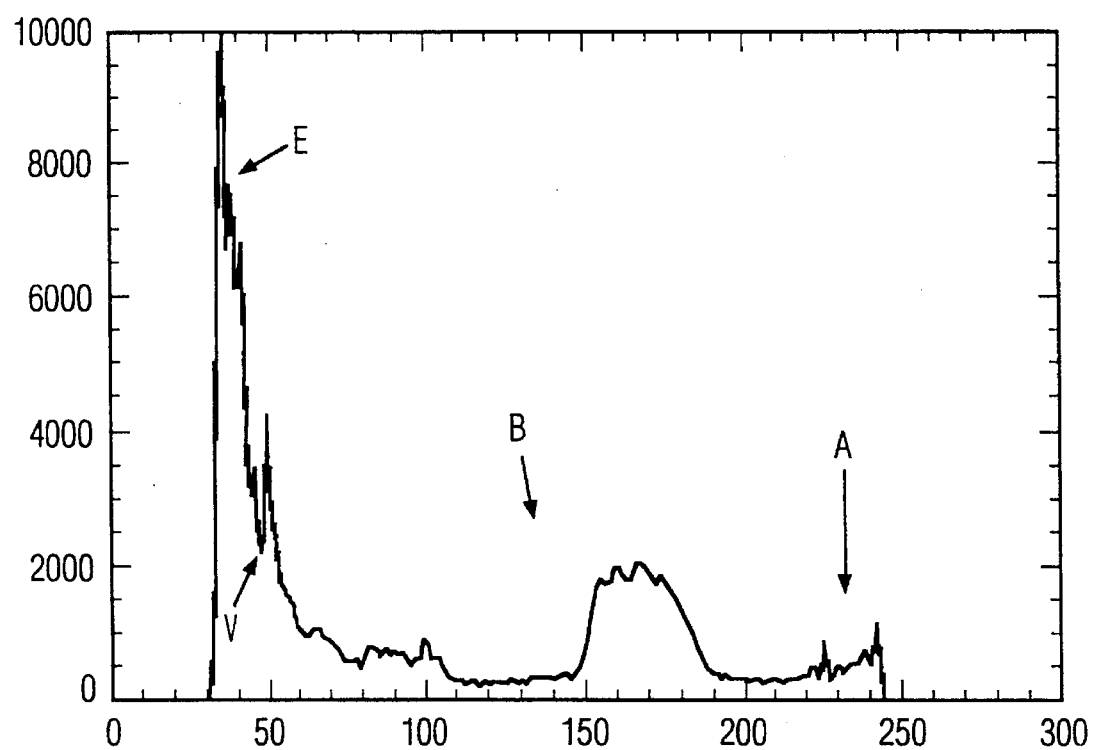
FIG. 3 is a representative histogram of pixel count versus gray value in an original mammogram image, which histogram is used in a step of the flow chart of FIG. 1.

In step 38 a histogram of the pixel counts versus gray values in the input array is computed. A typical input array histogram is shown in FIG. 3. The gray values typically fall into three regions. The first, labelled E, corresponds to the empty part of the background. The second region, labelled B corresponds to the interior of the breast, and the third region, labelled A, corresponds to artifacts in the background. The object is to choose an intensity threshold value to segment the image into an area that contains the interior of the breast and an area that contains the skinline and the background. This threshold value is determined from the histogram, after smoothing it, by looking for a valley that is located after the first peak. In FIG. 3, a suitable valley is marked as V. FIG. 4B shows the binary image resulting from comparing the intensities of the pixels of the input image with the intensity threshold value. Therein, pixels having the value digital one because their intensities exceed the intensity threshold are shown as white and pixels having the value digital zero because their intensities do not exceed the intensity threshold are shown as black.

An intensity gradient or edge detection operator is applied in step 40 to the input image in the area that contains the skinline and background (i.e. to those pixels of the input image of FIG. 4A that are black in FIG. 4B) which is then thresholded to keep only pixels with significant gradients. Preferably the Sobel operator is used (square root of the sum of the squares of the spatial derivatives in the two coordinate directions) as the intensity gradient operator since it provides the magnitude of the gradient. The significant gradients are in general caused by sloping down of the breast tissue at the skinline. FIG. 4C shows the binary image resulting from step 40. Therein, of the pixels that are black in FIG. 4B, those having the value digital zero in FIG. 4C because their gradients exceed the intensity gradient threshold are shown as white and those having the value digital zero because their gradients do not exceed the intensity gradient threshold are shown as black. Further, for purposes of illustration, pixels that are white in FIG. 4B are assigned the value digital zero in FIG. 4C and are therefor shown therein as black. In step 42, the results of steps 38 and 40 are combined by a union of the sets of white pixels in FIGS. 4B and 4C to form the union image shown in FIG. 4D. While this could be done by a pixel by pixel OR operation, it should be recognized that the union operation is easily integrated with step 40 by setting the pixels that are white in FIG. 4B to white in the union image.

Figure 4D:
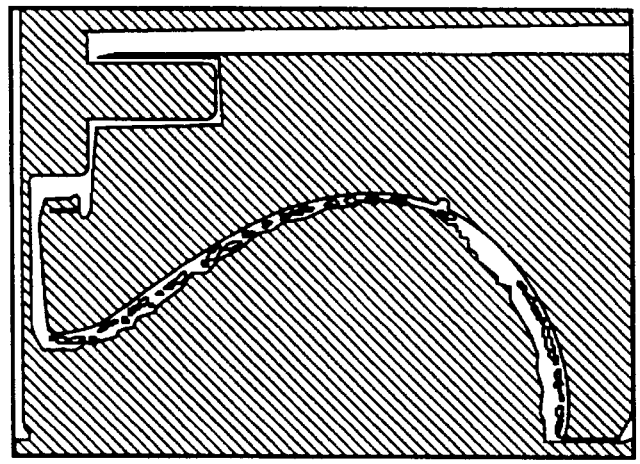

Unlike previous methods, the intensity threshold value used in step 38 is not critical. The union image will consist of most of the breast and some artifacts and parts from the background. In FIG. 4D, it will be recognized that the background is connected to the foreground at horizontal lines through at the top, some noisy points in the empty region were introduced in step 40, and there are holes in the breast area near the skinline. These artifacts are dealt with in step 44.

Therein, the first few and last few rows in the union image are checked. If a row contains almost all digital ones, it is removed. For the rows in the middle of the image, the breast area is checked to see if it is connected to the background. This is done by looking for a set of consecutive rows that have a run of digital ones much longer than their neighbors. This set of lines is removed and a second degree polynomial is fit in their place:

$$C=a_0+a_1r+a_2r^2$$

This fitting is done by using a set of points before and after the rows which are removed and minimizing:

$$\sum_{i=0}^{n} (c_i - a_0 - a_1r_1 - a_2r_i^2)^2$$

The breast will still have holes that need filling, so a connected component algorithm is applied to fill holes smaller than a certain empirically determined number of pixels in area, on the order of 100 pixels. Then to eliminate the noise in the empty region, morphological erosion and then dilation operations are applied with a 3 by 3 mask of ones. It was found empirically that applying erosion four times with this mask and then applying dilation four times gets rid of all the noise in the background.

Figure 4E:
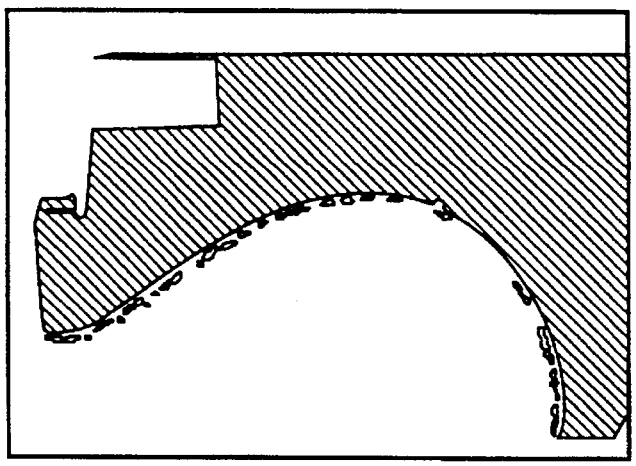

In some images there are gaps in the skinline. Therefore, the previous step will not fill holes in the breast that are connected to the background through gaps in the skinline. In situations like this, the effect of the gaps in the skin border can be minimized by applying morphological dilation and then erosion to the image with 3 by 1 and 1 by 3 masks respectively. FIG. 4E shows the result of step 44. Then in step 46, the skinline is readily detected by tracing the contour or border between black and white regions in FIG. 4E, and applying smoothing if necessary.

In step 48, a reference point on the skinline corresponding to the nipple is automatically detected. This method involves isolating a high curvature segment of the skinline and moving a small rectangular window along each point in the segment to search for a bright (high attenuation) area within the breast below the nipple caused by subcutaneous parenchymal tissue. The window is directed into the breast and is preferably two pixels high by eight pixels wide (i.e. 0.8×3.2 microns) from a point on the skinline segment. At each position of the window, the average (or total) of the intensities in the window is computed. The point on the skinline at which the window has the greatest average (or total) intensity is chosen to be the detected reference point corresponding to the nipple.

Figure 4F:
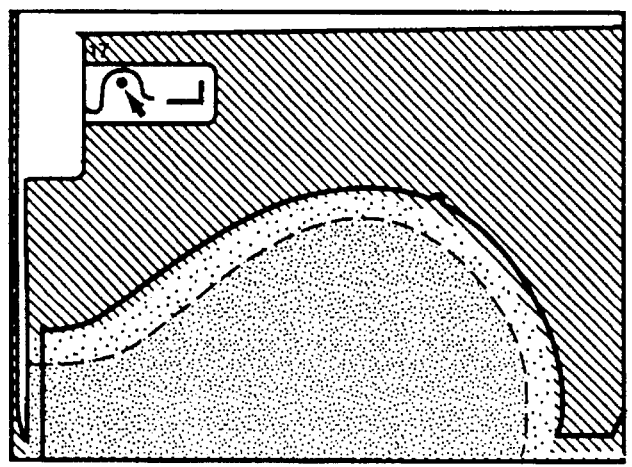
FIG. 4F illustrate the original image of FIG. 4A with the detected skinline and nipple superimposed thereon.

Lastly, for the purposes of the present invention, in step 50 the detected skinline, the detected nipple and the original input array are combined or superposed to produce an output array 52 corresponding to the image shown in FIG. 4F having the skinline and nipple outlined in bright white. It should be understood that in practice the output array 52 also has suspect areas marked or enhanced therein which areas are detected in a step 54 in the area segmented as the breast region. The identification of suspect masses is described in the U.S. patent application by the same inventor as this application which was filed on Jul. 14, 1994 as Ser. No. 08/274,939 entitled "Mass Detection in Digital X-ray Images Using Multiple Thresholds to Discriminate Spots". The identification of suspect clusters of microcalcifications is described in U.S. patent application, Ser. No. 08/003,071, filed Jan. 11, 1993, entitled "Computer Detection of Microcalcifications in Mammograms", which is also assigned to the same assignee as the present invention. The marked skinline and nipple serve as position references aiding interpretation of suspect areas that are marked by the computer.

It should now be appreciated that the objects of the present invention have been satisfied. While the present invention has been described in particular detail, numerous modifications are possible within the intended spirit and scope of the invention.

What is claimed is:

1. A method of producing a computer-enhanced mammogram comprising:

irradiating a breast of a subject being examined with X-ray radiation in a predetermined viewing direction;

receiving the X-ray radiation exiting the breast and its external surround from said viewing direction within a two-dimensional field;

producing digital signals as a function of the X-ray radiation received, which digital signals correspond to an input two-dimensional array of digital pixels;

in response to said signals, storing said input two-dimensional array of digital pixels in a digital memory means accessible to a computer;

with said computer, processing the stored two-dimensional array of digital pixels to detect a skinline and to produce an output two-dimensional array of digital pixels in which values of pixels in the output array corresponding to the detected skinline are set to values that mark the detected skinline;

wherein detection of the skinline includes a step of performing a coarse segmentation between the breast and its external surround including a union of first and second sets of pixels located at least in the vicinity of the skinline, the first set of pixels being of pixels having a measure of intensity exceeding a first threshold value and the second set of pixels being of pixels having a measure of intensity gradient exceeding a second threshold value.

2. The method as claimed in claim 1, wherein the nipple is automatically detected and both the skinline and the nipple are marked by the computer in the output image, the nipple being detected by searching the breast region within a window directed into the breast from a segment of the detected skinline, which window is moved along the segment and, based on the average of the measures of intensity of the pixels within said window, a point along the skinline segment corresponding to the nipple is identified.

3. A method of producing a computer-enhanced mammogram from an input mammogram stored in a digital memory means accessible to a computer as an input two-dimensional array of digital pixels in which the stored input two-dimensional array of digital pixels is processed with said computer to detect a skinline and to produce an output two-dimensional array of digital pixels in which values of pixels in the output array corresponding to the detected skinline are set to values that mark the detected skinline, wherein detection of the skinline includes a step of performing a coarse segmentation between the breast and its external surround in which for each pixel of a set of pixels located at least in the vicinity of the skinline, a measure of intensity at the pixel is compared with a first threshold value and a measure of intensity gradient at the pixel is compared with a second threshold value, and a binary image is formed in which only those pixels of the set for which the measure of intensity does not exceed the first threshold value and the measure of intensity gradient of the pixel does not exceed the second threshold value have a predetermined same one of two binary values.

* * * * *